US008438957B2

(12) United States Patent
Wener et al.

(10) Patent No.: US 8,438,957 B2

(45) Date of Patent: May 14, 2013

(54) DIGITAL BEAM TORQUE WRENCH WITH AN ELECTRONIC SENSOR

(75) Inventors: James Wener, Chicago, IL (US); Michael D. Rainone, Palestine, TX (US); Thomas E. Crippen, Tyler, TX (US)

(73) Assignee: Brown Line Metal Works, LLC, Chicago, IL (US)

( * ) Notice: Subject to any disclaimer, the term of this patent is extended or adjusted under 35 U.S.C. 154(b) by 201 days.

(21) Appl. No.: 12/938,280

(22) Filed: Nov. 2, 2010

(65) Prior Publication Data

US 2011/0132158 A1 Jun. 9, 2011

Related U.S. Application Data

(63) Continuation-in-part of application No. 12/115,367, filed on May 5, 2008, now Pat. No. 7,823,485, which is a continuation of application No. 11/500,064, filed on Aug. 7, 2006, now Pat. No. 7,367, 250.

(60) Provisional application No. 60/728,103, filed on Oct. 19, 2005.

(51) Int. Cl.
*B25B 23/142* (2006.01)
*G01L 5/24* (2006.01)

(52) U.S. Cl.
USPC .......................................... 81/478; 73/862.22

(58) Field of Classification Search ............ 81/477–479; 73/862.22, 862.23, 862.26, 862.328
See application file for complete search history.

(56) References Cited

U.S. PATENT DOCUMENTS

| | | | |
|---|---|---|---|
| 1,925,219 | A | 9/1933 | Weight |
| 2,007,880 | A | 7/1935 | Sharp |
| 2,159,373 | A | 5/1939 | Dunn |
| 2,250,941 | A | 7/1941 | Zimmerman |
| 2,367,224 | A | 1/1945 | Larson et al. |
| 3,076,362 | A | 2/1963 | Able |
| 3,142,177 | A | 7/1964 | Hanscom et al. |

(Continued)

OTHER PUBLICATIONS

Bratland et al., "Linear Position Sensing Using Magnetoresistive Sensors," Retrieved from the Internet on Nov. 22, 2010: URL:http://www/ssec.honeywell.com/magnetic/datasheets/linearpositionsensing.pdf.

(Continued)

*Primary Examiner* — David B Thomas

(74) *Attorney, Agent, or Firm* — Marshall, Gerstein & Borun LLP

(57) ABSTRACT

A torque wrench includes a main beam having a distal end and a proximal end, a drive element disposed at the distal end of the main beam, a stationary beam having a distal end fixedly secured to the main beam at a first location on the main beam, and having a proximal end, and a displacement sensor assembly disposed at a second location associated with the main beam and with the stationary beam to detect an amount of displacement of the main beam relative to the stationary beam. The displacement sensor assembly includes an actuating element secured to one of the main beam or the stationary beam and a sensor rigidly secured to the other one of the main beam or the stationary beam and responsive to the actuating element. An electronic component is configured to generate a torque measurement based on the generated electrical signal, and store at least one of the generated electrical signal and the torque measurement for a several positions of the main beam relative to the stationary beam.

23 Claims, 12 Drawing Sheets

U.S. PATENT DOCUMENTS

| | | | | |
|---|---|---|---|---|
| 3,274,827 | A | 9/1966 | Sturtevant | |
| 3,304,772 | A | 2/1967 | Campbell | |
| 3,525,256 | A | 8/1970 | Stasiek et al. | |
| 3,726,134 | A | 4/1973 | Grabovac | |
| 4,073,187 | A | 2/1978 | Avdeef | |
| 4,441,072 | A * | 4/1984 | Rahman | 323/368 |
| 4,533,872 | A * | 8/1985 | Boord et al. | 324/252 |
| 4,558,601 | A | 12/1985 | Stasiek et al. | |
| 4,569,742 | A * | 2/1986 | Schuetz | 204/192.21 |
| 4,664,001 | A | 5/1987 | Denman | |
| 4,665,756 | A | 5/1987 | Snyder | |
| 4,681,812 | A * | 7/1987 | Schuetz | 428/432 |
| 4,762,007 | A | 8/1988 | Gasperi et al. | |
| 4,805,464 | A | 2/1989 | Grabovac | |
| 4,847,584 | A * | 7/1989 | Pant | 338/32 R |
| 6,070,506 | A | 6/2000 | Becker | |
| 6,109,150 | A | 8/2000 | Saccomanno, III | |
| 6,276,243 | B1 | 8/2001 | Jenkins | |
| 6,463,811 | B1 | 10/2002 | Putney | |
| 6,529,114 | B1 * | 3/2003 | Bohlinger et al. | 338/32 R |
| 7,082,865 | B2 | 8/2006 | Reynertson, Jr. | |
| 7,089,834 | B2 | 8/2006 | Reynertson et al. | |
| 7,095,226 | B2 * | 8/2006 | Wan et al. | 324/247 |
| 7,367,250 | B2 | 5/2008 | Rainone et al. | |
| 7,823,485 | B2 | 11/2010 | Rainone | |

OTHER PUBLICATIONS

Honeywell, "Magnetic Displacement Sensors HMC150/1512," www.honeywell.com/magneticsensors (2009).

Honeywell, "Linear Position Sensor Module," HMR4001, Sensor Products (2001).

Honeywell, "Current & Positions Sensing: Using Honeywell's AMR Sensors," Magnetic Sensors—Current Sensing & Position Sensing (2006).

* cited by examiner

DIGITAL BEAM TORQUE WRENCH WITH AN ELECTRONIC SENSOR

RELATED APPLICATION DATA

This application is a continuation-in-part of the U.S. patent application Ser. No. 12/115,367, filed May 5, 2008 (issued as U.S. Pat. No. 7,823,485 on Nov. 2, 2010), which is a continuation of U.S. patent application Ser. No. 11/500,064, filed on Aug. 7, 2006 (now U.S. Pat. No. 7,367,250), which claims priority to provisional U.S. Patent Application Ser. No. 60/728,103, filed on Oct. 19, 2005. The entire disclosure of each of these applications is hereby incorporated by reference herein.

FIELD OF THE DISCLOSURE

The present disclosure relates generally to manual hand tools, and more particularly to a wrench for application of a controlled and/or measured amount of torque to threaded items such as bolts.

BACKGROUND TECHNOLOGY

The torque wrench has been a staple of the mechanic's tool chest for perhaps a hundred years or more. As would be familiar to those of ordinary skill, a torque wrench is a wrench used to precisely set the torque of a threaded fastening item such as a nut or a bolt. Torque wrenches are used where the tightness of fasteners is crucial, allowing the operator to measure and/or control the amount of torque applied to the fastening device so that it can be matched to specifications.

The application, measurement and retention of information relative to the torque applied to various mechanical items becomes increasingly important for increasingly complex mechanical devices and systems. Accurate, precise and controlled application of torsion force (torque) is increasingly required for many applications involving safety considerations as well as regulatory, investigative, and production process tracking and audit trails, in addition to merely ensuring that a system whose reliable operation depends upon correct application of torsional force to its components. Further, the range of environments in which torque wrenches are used varies widely, and influences the ability of the tool operator to reliably and repeatedly apply torque to a system.

A common type of torque wrench is referred to as a "beam-type" torque wrench. In general, a beam-type torque wrench comprises an elongate lever arm (beam) having a handle on a proximal end and a wrench head (socket) at a distal end for engaging an item to which torsional force is applied. The beam is made of a material which will flex elastically along its length under applied force. A second, smaller bar carrying an indicator is connected to the distal end of the beam and extends substantially in parallel with the beam toward the proximal end. The proximal end of the second arm is not secured to the main beam, and hence is not subjected to strain and remains straight during use of the wrench. A calibrated scale is fitted to the handle in proximity to the proximal end of the second arm. The bending of the main beam under application of force causes the scale to move under the proximal end of the second aim. When the desired indicated torque is reached, the operator stops applying force.

Reading the displacement of the beam, which is the measure of the amount of torque applied, is the most important feature of the digital beam torque wrench. The repeatability of the displacement of the standard beam type torque wrench has been established. The beam torque wrench has the ability to be more accurate and repeatable than other conventional and/or more expensive torque wrench technology. However, a potential problem with existing beam type torque wrenches lies in the difficulty of the human eye in discriminating the rather limited displacement of the beam relative to the indicator.

It is believed, therefore, that there remains a need for a torque wrench that can be efficiently read with a high degree of accuracy. Moreover, there is an increasing need for torque wrenches having additional functional capabilities, such as providing additional forms of readout (for example, visual, and/or audible), and/or providing a means for recording, storing, and perhaps transmitting measured torque values.

SUMMARY

In view of the foregoing, the present disclosure is directed to a torque wrench system which incorporates three main functional components: first, a means for accurate measurement of beam displacement; second, a user interface for communicating torque values to the operator; and third, an electronic system for storage and retrieval of torque values.

In one embodiment, a torque wrench is provided having a displacement sensing assembly for highly accurate measurement of beam displacement, a first electronic subsystem for conversion of beam displacement measurements to torque values, and a second electronic subsystem for acquiring, storing, and communicating torque values.

In one embodiment, a torque wrench is provided which utilizes a rack-and-pinion potentiometer assembly at the proximal end of the main beam of the wrench. Displacement of the beam during application of torsion force rotates the potentiometer, which in turn modulates an analog voltage whose magnitude thus correlates to the degree of displacement of the beam, and hence to the amount of torque applied. The sensor voltage is supplied to an electronics system for conversion to a digital torque value.

In some embodiments, an interface is provided for measuring, reporting, and storing sensed torque values. In various embodiments, the interface may involve voice chips for audible annunciation of readout values, buzzers, speakers, and/or digital displays. The electronics associated with the torque sensing and interface functions may be implemented using microprocessors or application-specific integrated circuits, possibly powered by batteries, and may further include memory for storage of torque readout values, and a transmission system for reporting torque readout values to a remote transceiver.

In some embodiments, the components of the digital beam torque wrench are enclosed within a rugged, light weight, ergonomically sensitive, element resistive housing. In an embodiment, the wrench is designed to permit easy reading, easy setup, and easy access for applications.

BRIEF DESCRIPTION OF THE DRAWINGS

The foregoing and other features and aspects of the present disclosure will be best appreciated by reference to a detailed description of the specific embodiments, when read in conjunction with the accompanying drawings, wherein.

DETAILED DESCRIPTION

In the disclosure that follows, in the interest of clarity, not all features of actual implementations are described. It will of course be appreciated that in the development of any such actual implementation, as in any such project, numerous engineering and technical decisions must be made to achieve the developers' specific goals and subgoals (e.g., compliance with system and technical constraints), which will vary from one implementation to another. Moreover, attention will necessarily be paid to proper engineering practices for the environment in question. It will be appreciated that such a development effort might be complex and time-consuming, but would nevertheless be a routine undertaking for those of ordinary skill in the relevant fields.

Figure 1:
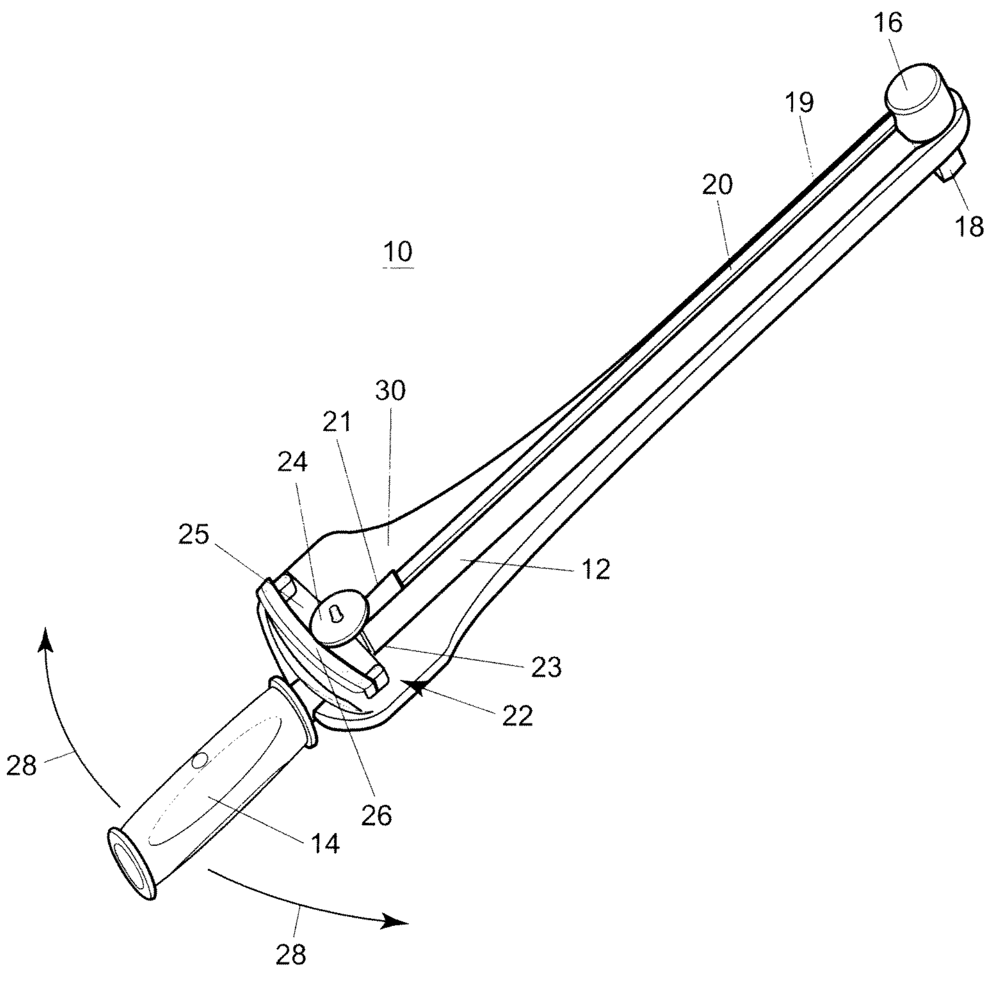
FIG. 1 is a perspective view of a torque wrench system in accordance with one embodiment with an upper half of the housing thereof removed to expose the various operational components thereof.

Referring to FIG. 1, there is shown a digital beam torque wrench 10 in accordance with one embodiment. As shown in FIG. 1, wrench 10 comprises a main beam 12 having a handle or grip assembly 14 on a proximal end 23 thereof, and a distal end 16. As would be apparent to those of ordinary skill in the art, a socket drive 18 typically including a socket square for exchangeably securing sockets of various sizes (not shown) is disposed on distal end 16 of main beam 12. Socket drive 18 may be of a fixed or ratcheting type, as would be apparent to those of ordinary skill in the art.

Grip assembly 14 is used to facilitate convenient and functional movement of the digital beam torque wrench 10. The handle 14 is also designed to ensure that the operator applies the force at the correct location. In one embodiment, grip assembly 14 comprises a grip handle consisting of a formed material suitable for conforming to manual human hand gripping and operationally manipulating wrench 10 before, during and after application of torsional force.

In a highly upfeatured embodiment (i.e., one incorporating certain elements which might not be necessary or appropriate in all cases), the gripping handle component includes an automated attachment assembly for use in remotely operated torsional force application environments and settings.

With continued reference to FIG. 1, wrench 10 further comprises an elongate stationary beam 20 having a distal end 19 and proximal end 21. In an embodiment, distal end 19 is fixedly secured or attached substantially at or near distal end 16 of main beam 12. As is apparent from FIG. 2, elongate stationary beam 20 extends substantially in parallel to the elongate body of main beam 12. Stationary beam 20 is carried though attachment at its distal end 19 to main beam 12, its proximal end 21 being uncoupled from main beam 12 (as used herein, the term "uncoupled" it intended to refer to an arrangement whereby the proximal end 21 of stationary beam 20 is not rigidly secured to main beam 12, although, as will be hereinafter described, there may be some mechanical contact between the proximal end 21 of stationary beam and main beam 12, although such contact does not restrict movement of main beam 12 relative to the proximal end of 21, as will hereinafter become apparent.)

In an embodiment, a beam displacement sensor assembly 22 is disposed substantially at or near proximal end 23 of said main beam 12. Sensor assembly 22 functions to provide an indication of relative movement of main beam 12 relative to stationary beam 20. A notable consequence of such an arrangement is that flexure of main beam 12 upon application of force to proximal end 23 of main beam 12 causes deflection of main beam 12 along its length, while stationary beam remains unmoved.

Stationary beam 20 is able to, in general terms, reveal (sense) the degree of deflection of main beam 12 along its length when force applied to grip assembly 14 is sufficient to cause such deflection of main beam 12, such that a measurable and discernable amount of torque is being exerted by wrench 10 at distal end 16 of main beam 12.

It is contemplated that various beam displacement sensing mechanisms 22 can be applied in the practice of a torque wrench of the present disclosure. By way of illustration only, in the embodiment of FIG. 1, beam displacement sensing assembly 22 comprises a rack-and-pinion rotary position sensor 25 including an actuable element 24 and an actuating element 26. In the embodiment of FIG. 1, actuable element 24 comprises a pinion gear coupled to the axis of a potentiometer. It is to be noted that in FIG. 1, an upper portion of an outer protective housing 30 is not shown, so as to expose to view the various functional components of wrench 10. In an embodiment, operational housing 30 is formed of a suitably high strength material, such as, for example, plastic, metal, ceramic, which may be, as necessary, chemically resistive, crush resistive, light weight, and conformally shaped. In a downfeatured embodiment, housing 30 may be partially or completely omitted so as to allow use in low cost, environmentally friendly torsional force application environments.

A position sensor actuating element 26 is affixed to proximal end 23 of main beam 12. In the embodiment shown in FIG. 1, position sensor actuating element 26 comprises an arcuate rack gear 26 affixed to the proximal end 23 of main beam 12 and positioned so as cooperatively engage pinion gear 24 of sensor assembly 22. That is, position sensor actuator 26 is in cooperative disposition with respect to actuable element 24, such that relative movement between actuating element 26 and actuable element 24 can be detected, as is hereinafter described.

As will be appreciated by those of ordinary skill in the art having the benefit of the present disclosure, wrench 10 is utilized to apply measured torsional forces to fastening elements such as bolts, nuts, and the like. Operation of the wrench involves application of force on grip assembly 14 in the direction indicated by either one of arrows 28 in FIG. 1. As more and more torque through application of force upon grip assembly 14 is exerted on a fastening element via a socket (not shown) engaged in socket drive 18, main beam 12 will undergo a gradually increasing degree of flexure along its length, such that arcuate rack gear (actuating element) 26, which is in fixed contact with a generally distal end of beam 12, moves laterally with respect to the proximal end 21 of stationary beam 20. Any movement of rack gear (actuating element) 26 resulting from flexure of beam 12 in turn, causes a corresponding degree of rotation of pinion gear (actuable element) 24, owing to the engagement of the teeth of pinion gear 24 with the teeth of rack gear 26.

In the merely illustrative embodiment of FIG. 1, beam displacement sensing assembly 25 comprises a potentiometric rotary position sensor 22, many examples of which being well known to those of ordinary skill in the art and commercially available from many manufacturers. Such sensors translate rotary movement into an analog voltage which varies proportionally with the extent of rotary movement. When coupled to pinion gear 24, therefore, beam displacement sensing assembly 25 generates a signal corresponding to the extent of rotation of pinion gear 24 caused by flexure of main beam 12. Since a given torsion force will result in a known degree of deflection of main beam 12, the output signal from position sensor assembly 25 will proportionally correlate with applied torsional force.

In an alternative embodiment, it is contemplated that multiple rotational sensors may be incorporated into the digital beam torque wrench to accommodate dynamic torsional force application to systems which do not have a static torsional force characteristic. Multiple sensors would be used to differentiate, profile, characterize, and interpret multiple signals for accurate application of force in non-constant torsional force application and feedback settings.

In accordance with a notable aspect of the disclosure, wrench 10 includes an electronics package (not shown in FIG. 1) enabling wrench 10 to perform various functions as shall hereinafter described. It is contemplated that the electronics associated with wrench 10 may be advantageously enclosed within handle assembly 14 or proximate to sensor assembly 22 within housing 30, or both. The exact location(s) of the electronics is regarded as a mere decision and is not believed to be of particular relevance to the present disclosure. In addition, the details concerning implementation of the electronics package are not believed to be described herein except in functional terms. It is believed that persons of ordinary skill in the art having the benefit of the present disclosure would be readily able to implement the electronic system(s) necessary to achieve the functionality described herein. Such electronic system(s) may be implemented using a general purpose microprocessor or the like, or using application-specific integrated circuits, as would be familiar to those of ordinary skill. Furthermore, such features that require transmission of data and command to and from wrench 10 can be implemented using any of a wide variety of remote transceiver devices and technologies.

Figure 2:
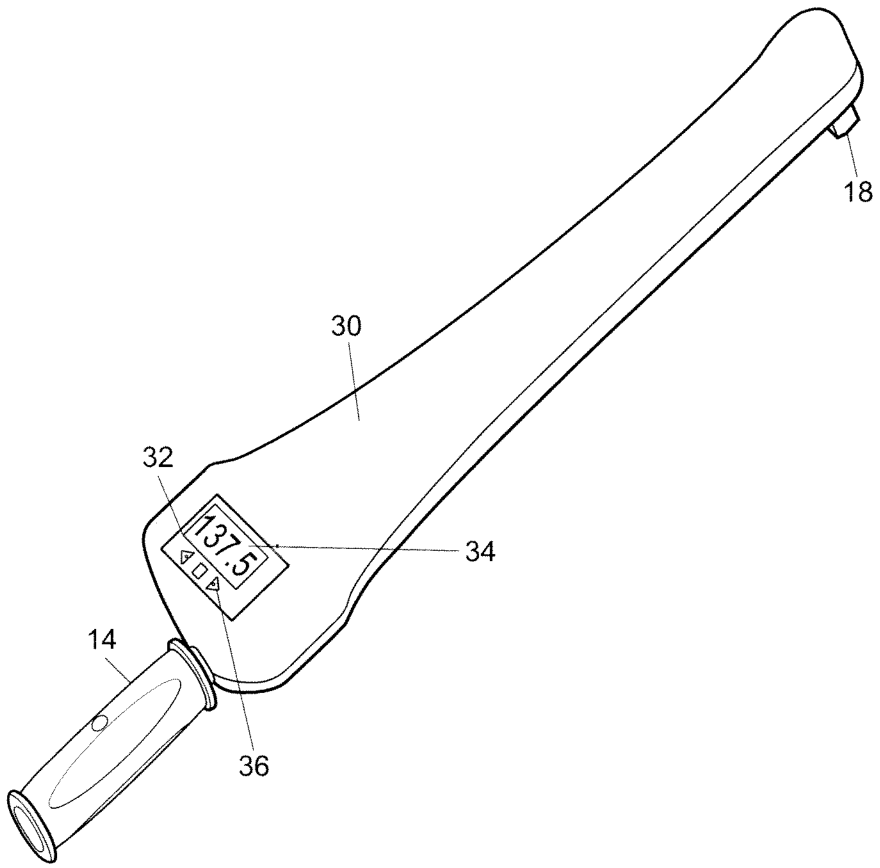
FIG. 2 is a perspective view of the wrench of FIG. 1 with its housing.
Figure 3A:
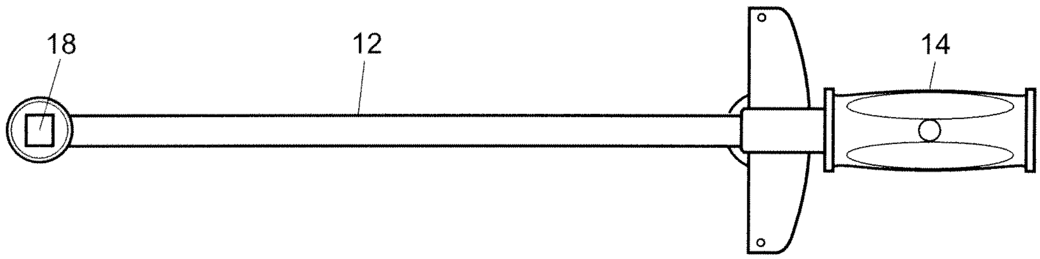
FIGS. 3*a*, 3*b*, 3*c*, 3*d*, and 3*e* are bottom, side, top, proximal end, and distal end views, respectively, of the wrench from FIG. 1, with the housing removed to expose operational components thereof.
Figure 3B:
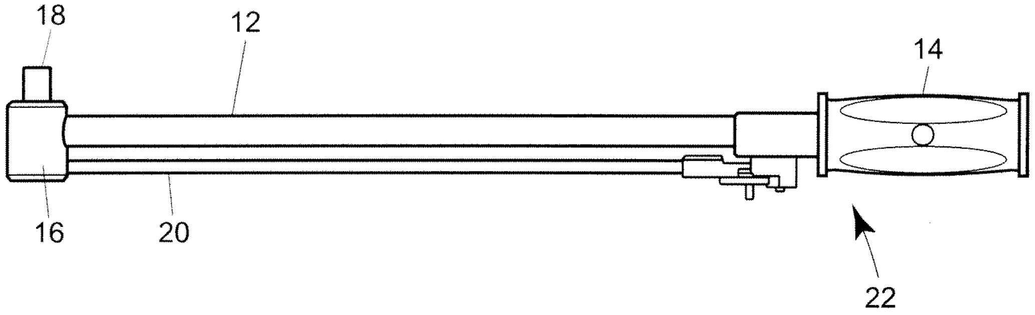
Figure 3C:
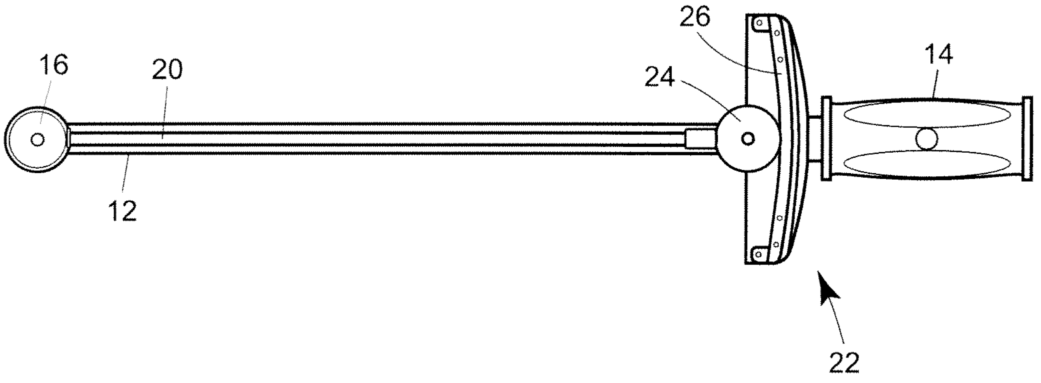
Figure 3E:
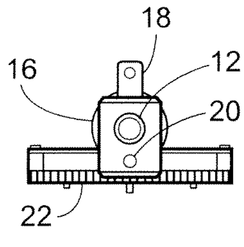
Figure 3D:
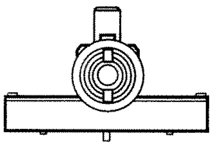
Figure 4A:
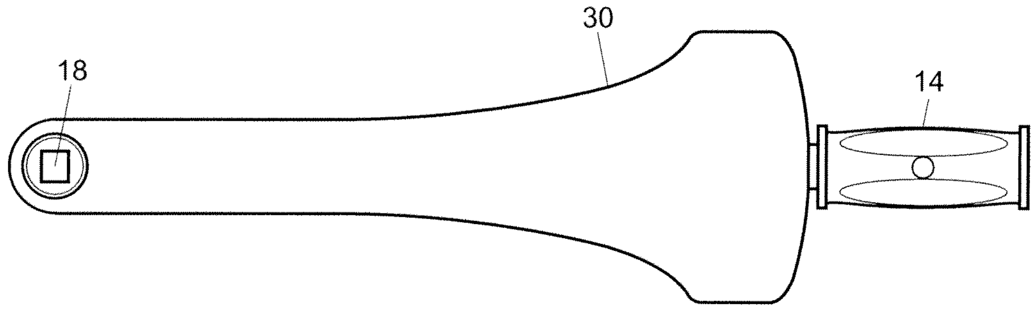
FIGS. 4*a*, 4*b*, 4*c*, 4*d*, and 4*e* are bottom, side, top, proximal end, and distal end views, respectively, of the wrench from FIG. 1, showing the housing and illustrating placement of a digital readout on an upper surface of the housing.
Figure 4B:
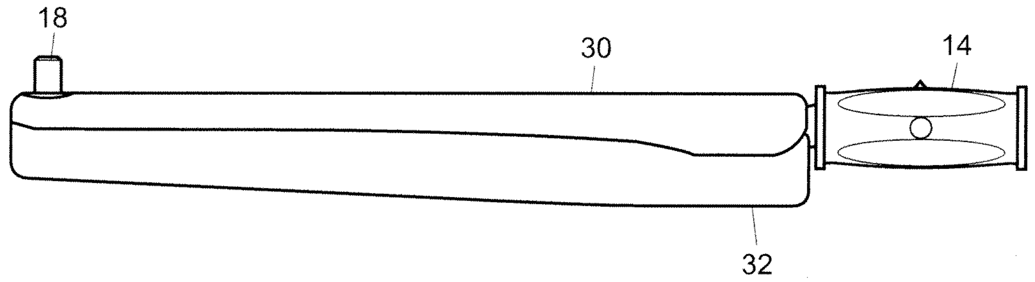
Figure 4C:
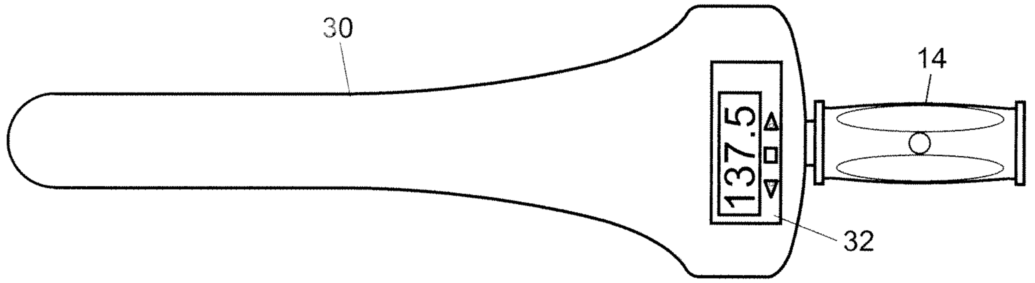
Figure 4E:
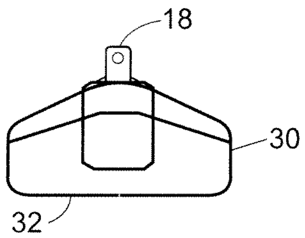
Figure 4D:
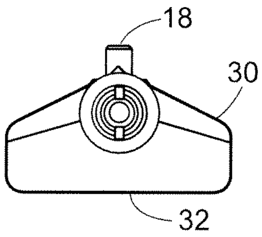

Operation and control of the digital beam torque wrench is accomplished using singularly, or in combination, a series of one or more buttons or human finger touch pads. Referring to FIG. 2, there is shown a perspective view of wrench 10 including its entire housing 30. As shown in FIG. 2, housing 30 carries a control and display module 32 which includes, in the presently disclosed embodiment, a digital readout 34 and one or more user-actuable buttons or switches 36.

In a highly upfeatured embodiment, the control/selection buttons 36 and pads would be replaced, bypassed or enhanced through an electronic wireless communication module that would enable two-way communication of information and control comments to/from the digital beam torque wrench and a remote control interface unit.

The electronics associated with wrench 10 function to receive, format, filter, mathematically manipulate, scale, and otherwise convert the data and information from the one or more rotational displacement position sensors 22 into applied torsional force information. Additionally, the electronics enables wrench 10 to sense its operational environment and receive inputs from user interfaces, either physically local to wrench 10 or remotely transmitted to wrench 10, thereby allowing for selection and control of modes of operation, as well as application of data ranges and type selection criteria for proper operation of the torque wrench.

In embodiments which include audio feedback functions, audible annunciation of various degrees of closeness before or after a torque set point would be provided in fixed or adjustable degrees of volume to human operators. In embodiments which include visual feedback functions, differing colors, brightness, singular or multiple, simultaneous or sequential lights or alpha-numeric or a combination are used to feedback, notify, warn, alert, confirm, identify the operating state of the digital beam torque wrench.

It is contemplated that various embodiments may provide for the continuous retention of data relating to torsional forces applied by wrench 10. The torsion values may be recorded in a local memory 56 within housing 30 for later transmission or transfer to a remote device. The retained data may relate to torsion before, during and after the application of the torque wrench to operational systems and environments. A manual and/or electronic selection process for starting, stopping, recording, resetting, erasing or controlling other data storage manipulation functions can be accomplished using control buttons 36.

Wrench 10 further functions in one embodiment to provide a means for retrieving, uploading, modifying and otherwise transporting operational and control information to or from the wrench 10 before, during or after operational use.

In a highly "upfeatured" embodiment, an electronic wired or wireless communication transceiver enables transport of actual torsional force application profiles from the wrench 10 to a remote data acquisition system. In a separate or combined "upfeatured" embodiment, an electronic wired or wireless communication link 64, to be described hereinafter in further detail, enables transport of planned torsional force application data profiles to the digital beam torque wrench from a remote data command and control system for application of torsional force by an automated, non-human operating environment.

As would be apparent to those of ordinary skill in the art, electronics associated with wrench 10 requires a source of electrical energy, which may be, for example, one or more internal, rechargeable or user-replaceable batteries. In one embodiment, it is contemplated that the electronics of wrench 10 may include circuitry for monitoring and/or managing power. For example, a warning alarm (either audible or visual) may be activated to notify the user of battery depletion or near-depletion. It will further be understood that varying embodiments may require one or more types and amounts of electrical energy to carry out the various functions described herein. In a highly "defeatured" embodiment, a simple portable, self-contained, disposable, replaceable or otherwise changeable battery is incorporated.

In highly "upfeatured" embodiments, more powerful, larger, longer lasting or otherwise scalable power sources and methods can be incorporated, such as but not limited to, larger batteries, replaceable, rechargeable batteries and associated recharge electronics (internal and external to the digital beam torque wrench itself, and even direct power supply connection configurations.

Figure 5:
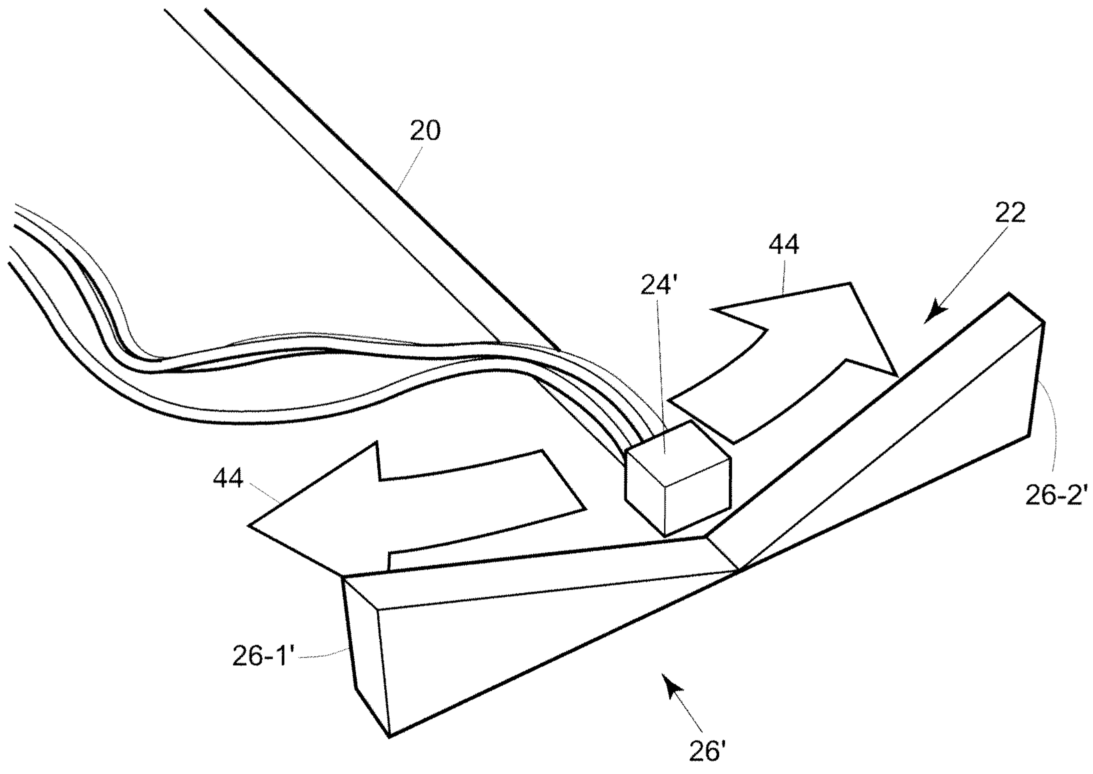
FIG. 5 is a schematic perspective view of a digital beam torque wrench in accordance with an alternative embodiment employing an alternative beam displacement sensing system.

Referring to FIG. 5, there is shown a schematic representation of a wrench 10' in accordance with an alternative embodiment incorporating an alternative beam displacement sensing assembly 22'. Sensing assembly 22' is contemplated to be among the various suitable substitutes for the illustrative assembly 22 described above with reference primarily to FIG. 1. In particular, as represented in FIG. 5, a sensing assembly 22' including an actuable element 24' in the form of a ratiometric Hall Effect sensor 24' and corresponding in general functional terms with actuable element 24 in the embodiment of FIG. 1 is provided. As shown in FIG. 5, such a scheme is further implemented by providing an actuating element 26' in the form of a magnetic structure 26' and corresponding in general functional terms with actuating element 26 in the embodiment of FIG. 1.

Actuating element 26' in FIG. 5, like actuating element 26 in the embodiment of FIG. 1, is rigidly attached to a main beam 12 (for clarity, not shown in FIG. 5), and situated proximal to and in cooperation with actuable element (ratiometric Hall effect sensor) 24' that is supported by the proximal end 21 of stationary beam 20.

Those of ordinary skill in the art will appreciate from FIG. 5 that any flexure of main beam 12 will cause displacement of magnetic structure 26' relative to sensor 24', which remains stationary.

In the embodiment represented schematically in FIG. 5, magnetic structure 26' has a profile which varies laterally along its lateral length. In particular, in the embodiment of FIG. 5, magnetic structure 26' has a profile which varies from a minimum height in the center thereof to maximum heights at either of its extremities (26-1' and 26-2'). This configuration causes Hall Effect sensor 24' to detect a magnetic field that changes with increasing displacement of main beam 12 toward either extremity 26-1' or 26-2' (i.e., in the direction of either arrow 44 in FIG. 5). The output of the Hall Effect sensor 24' thus varies in proportion to the extent of displacement, and hence to the amount of torque being applied by the wrench. Ratiometric Hall effect sensors suitable for the purposes of practicing some of the techniques of the present disclosure as described herein are well-known and commercially available from many sources.

Figure 6:
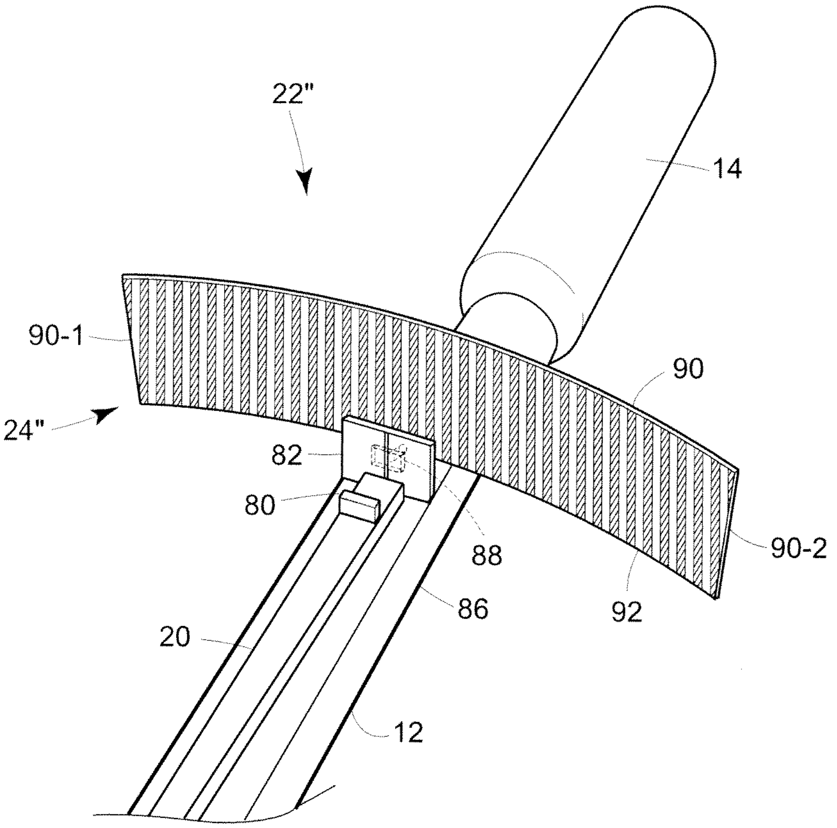
FIG. 6 is a schematic perspective view of a digital beam torque wrench in accordance with an alternative embodiment employing another alternative beam displacement sensing system.

Turning now to FIG. 6, there is shown a representation of a wrench 10" in accordance with another alternative embodiment, incorporating an alternative beam displacement sensing assembly 22". Sensing assembly 22" in FIG. 6 is contemplated to be yet another of the various suitable substitutes for the illustrative assembly 22 described above with reference primarily to FIG. 1, and in the other alternative embodiment described above with reference primarily to FIG. 5.

In particular, and as shown in FIG. 6, a sensing assembly 22" is provided, including an actuable element in the form of an optical photodiode 80, along with an associated aperture plate 82 and a radiation source 88, this combination corresponding in general functional terms with actuable element 24 in the embodiment of FIG. 1. Photodiode 80 is disposed at or near the proximal end 21 of stationary beam 20, and aperture plate 82 is mounted proximally in front of photodiode 80 so as to guide radiation impinging upon photodiode 80 to a restricted lateral dimension. The restricted lateral dimension is established by the width of a slit 86 in aperture plate 82.

As shown in FIG. 6, sensing assembly 22" further comprises an actuating element in the form of an indexed register 90 rigidly affixed to main beam 12, the indexed register 90 corresponding in general functional terms with actuating element 26 in the embodiment of FIG. 1, and having lateral extremities designated with reference numerals 90-1 and 90-2 in FIG. 6.

In the embodiment of FIG. 6, the actuating element (consisting of indexed register 90) is situated proximal to and in functional cooperation with the photodiode 80, which is carried on the proximal end 21 of displacement beam 20. Actuating element 90 in the embodiment of FIG. 6 in an embodiment comprises an arcuate planar surface having a plurality of contrasting, spaced-apart index marks, an exemplary one of such plurality of index marks being identified with reference numeral 92 in FIG. 6.

In the embodiment of FIG. 6, it is contemplated that radiation source 84 may consist of a light-emitting diode (LED), many different species of which being widely known and commercially available from any number of suppliers.

Those of ordinary skill in the art will appreciate from FIG. 6 that any flexure of main beam 12 will cause a corresponding lateral displacement of mask 80 (rigidly affixed to main beam 12) relative to actuable element (photodiode) 24", which by virtue of being disposed on or near the proximal end 21 of stationary beam 20, remains stationary.

In the embodiment represented in FIG. 6, the plurality of vertical index markings 92 on indexed register 90 tend to modulate the intensity of radiation (light) reflected off of register 90 as may be directed to register 90 by radiation source 84. This arrangement causes a modulation of radiation reflected off of index register 90 and subsequently detected by photodiode 82.

Figure 6A:
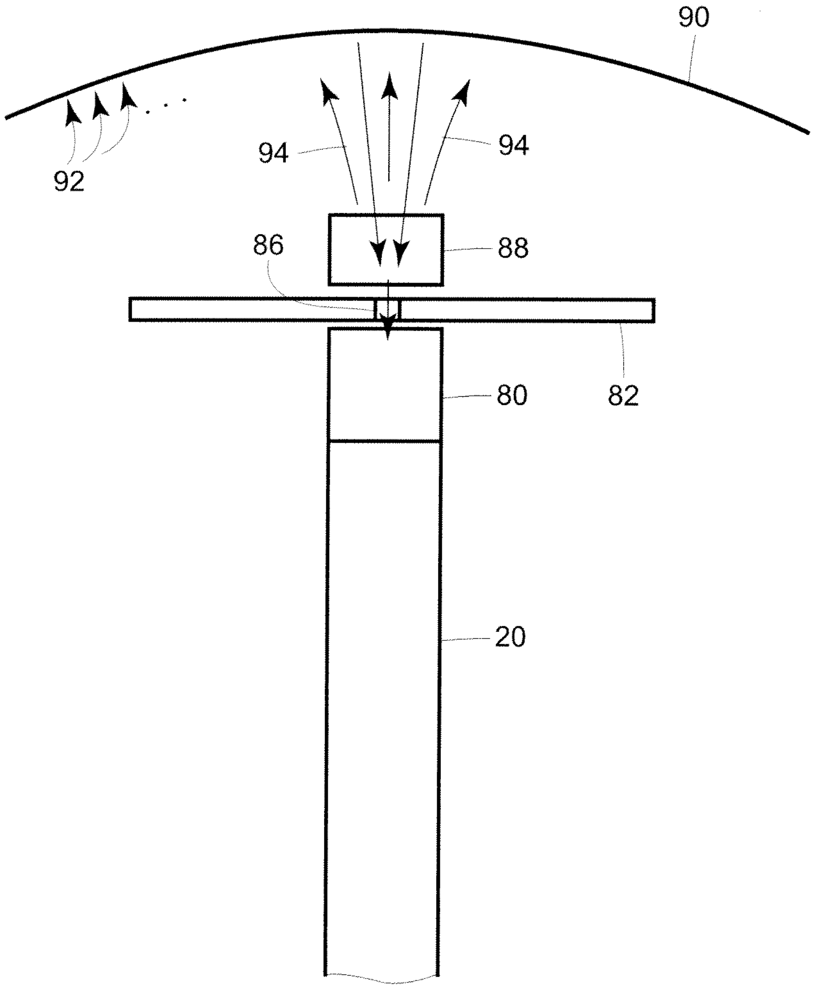
FIG. 6A is a top view of the digital beam torque wrench of FIG. 6A.

Turning to FIG. 6*a*, those of ordinary skill in the art will appreciate that the slit 86 in aperture plate 82 functions to define the lateral extent of radiation reflected off of index register 90 such that radiation from radiation source 88 (represented by arrows 94 in FIG. 6*a*) is intermittently reflected or absorbed by index register 90, depending upon the position of index register 90 relative to photodiode 88. This position of index register 90 is, in turn, dependent upon the degree of flexure of main beam 12 (not shown in FIG. 12), to which index register 90 is affixed.

In an embodiment, slit 86 in aperture plate 82 is a vertically elongate slit of width on the order of 0.03 mm. Likewise, vertical index markings 92 on index register 90 have a width on the order of 0.03 mm, with interstitial gaps of comparable width. (Those of ordinary skill in the art will appreciate that the width of slit 86 and of markings 92, the relationship between such widths, as well as the widths of interstitial gaps between markings 92 may be varied from implementation to implementation depending upon a number of factors, include, for example the desired maximum precision of torque measurement of the wrench, as well as the resolution of photodiode 80.

The structural relationship of photodiode 80, aperture plate 82 and slit 86, and index register 90 results in the actuable element (photodiode) 24" being capable of detect pulses of radiation (light) according to the displacement of main beam 12 relative to slit 86 in aperture plate 82. The output of the actuable element (photodiode) 24" consequently provides a stream of pulses reflecting the relative movement of main beam 12 and stationary beam 20, and hence to the amount of torque being applied by the wrench 10".

Photodiodes suitable for the purposes of practicing some of the techniques of the present disclosure as described herein are well-known and commercially available from many sources, as are complementary radiation sources whose emissions are detectable by such photodiodes.

Figure 7:
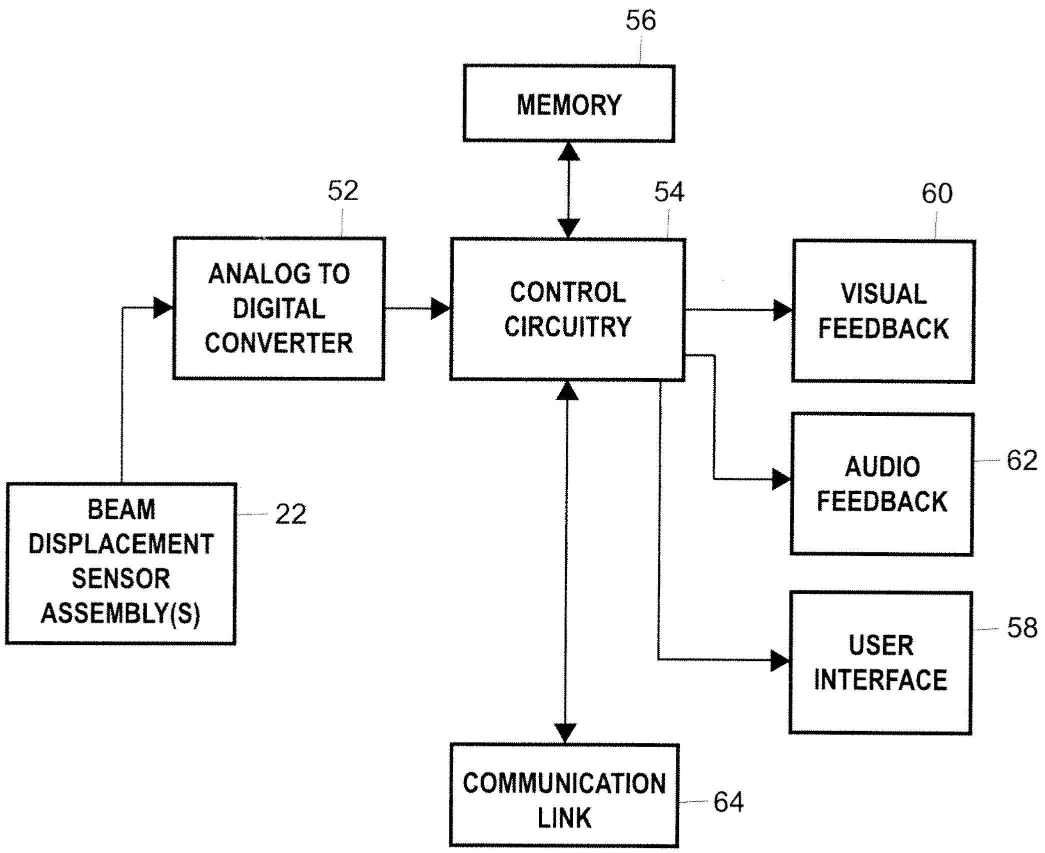
FIG. 7 is a functional block diagram of electronic circuitry incorporated into a digital beam torque wrench in accordance with any one of a variety of embodiments.

Referring to FIG. 7, there is shown a functional block diagram of an electronics system incorporated into a torque wrench such as torque wrench 10 in accordance with an exemplary embodiment. It is to be understood that the implementation of electronic systems illustrated in FIG. 7 corresponds to a relatively full-featured (upfeatured) implementation, and those of ordinary skill in the art having the benefit of the present disclosure will appreciate that the techniques of the present disclosure may be practiced in a form encompassing fewer or greater functional capabilities than depicted and described with reference to FIG. 7.

Any embodiment of the invention can be assumed to incorporate a beam a displacement sensor assembly 22 capable of sensing with a necessary degree of precision and accuracy, the extent of deflection of main beam 12 as a result of the exertion of force upon grip assembly 14. In some contemplated embodiments, the sensing of deflection by assembly 22 manifests itself as an analog voltage whose level correlates to the degree of deflection.

As shown in FIG. 7, the output from beam displacement sensor assembly 22 in the illustrative embodiment is applied to an analog-to-digital (A/D) converter 52, which, as would be understood by those of ordinary skill in the art, generates digital (customarily binary) signals corresponding to the level of the output voltage from sensor assembly 22. A/D converters suitable for the purposes discussed herein are widely used in the art and available in many suitable forms from many commercial suppliers.

The digital output from A/D converter 52 is, in the illustrative embodiment, provided to control circuitry 54. As previously mentioned, and as would be fully appreciated by those of ordinary skill in the art, control circuitry 54 may be implemented in various ways, such as in the form of a semiconductor microprocessor, of which countless examples are known and available to those of ordinary skill in the art, or, alternatively, using customized application-specific integrated circuit modules (ASICs), which are likewise well-known and commonly employed by persons of ordinary skill in the art to achieve the functionality of the device as described herein.

In an embodiment, control circuitry 54 has associated therewith a suitable capacity of digital memory 56, such as may be implemented using any of the known semiconductor memory technologies familiar to persons of ordinary skill in the art (DRAMs, SDRAMs, etc. . . . ).

In an embodiment, control circuitry 54 is capable of reception of digital values from A/D converter 52 in real time, either synchronously or asynchronously, and processing this input data as necessary to achieve the functionality as described herein.

In one embodiment, torque values are received by control circuitry 54 on a continuous basis over controlled intervals, which may be specified, for example by the operator of wrench 10 through user interface 58, as shall be hereinafter described. In any case, in one embodiment, one or more torque measurement values are periodically or continuously stored in memory 56 for later retrieval and/or processing.

In an illustrative embodiment, torque measurement values originating from the analog voltage signals produced by beam displacement sensor assembly 22 are periodically, or on demand, communicated to the operator via one or more feedback means, including, without limitation, a visual feedback means and/or an audio feedback means. (Theoretically, although not specifically depicted in the Figures, wrench 10 may be further provided with the necessary haptic capabilities to provide sensory (tactile/vibrational/resistive) feedback to the user during operation of the device.)

In one embodiment, visual feedback means 60 comprises a simple segmented digital (e.g., LED or LCD) display, with the displayed numerals corresponding in real time to the amount of torque being applied at wrench end 16 as a result of the exertion of force to grip end 14.

In another embodiment, audio feedback may be provided as represented by block 62 in FIG. 6, alerting the operator, for example, when a threshold torque value has been reached.

In at least some of the embodiments, a user interface 58 of some sort is provided. In a simple implementation, user interface 58 may comprise a limited number of user-actuable buttons carried by housing 30. The use of a limited number of user-actuable buttons to control various operational features of electronic devices is a well-proven and commonly employed concept familiar to anyone of ordinary skill in the art. A common example is the very popular and expansive range of digital timepieces available on a mass consumer basis.

On the other hand, user interface 58 could in more upfeatured embodiments comprise more sophisticated interface means, which would be no less familiar to anyone of ordinary skill in the art.

Finally, in some embodiments, it is desirable to incorporate an external communications link, as represented by block 64 in FIG. 6. As alluded to elsewhere in this disclosure, communications link 64 can take the form of a wireless telemetry link of which numerous examples are well-known in the art, or a hard-wired link, for example (but not by limitation) a serial port, a USB port, or the like. Communications link 64 may be capable of relaying data to control circuitry 54 concerning torque measurement limits, controls, threshold alarm settings, and so on, as would be readily appreciated by those of ordinary skill in the art.

Communications link 64 may further include transceivers for communication between device 10 and other, similar or related devices utilized in a common application or setting. As necessary, a device such as device 10 may be capable of receiving operational signals from other devices and processing such signals either to control its own operation or to ensure that corresponding information is relayed to still other compatibly communicative devices.

Figure 8A:
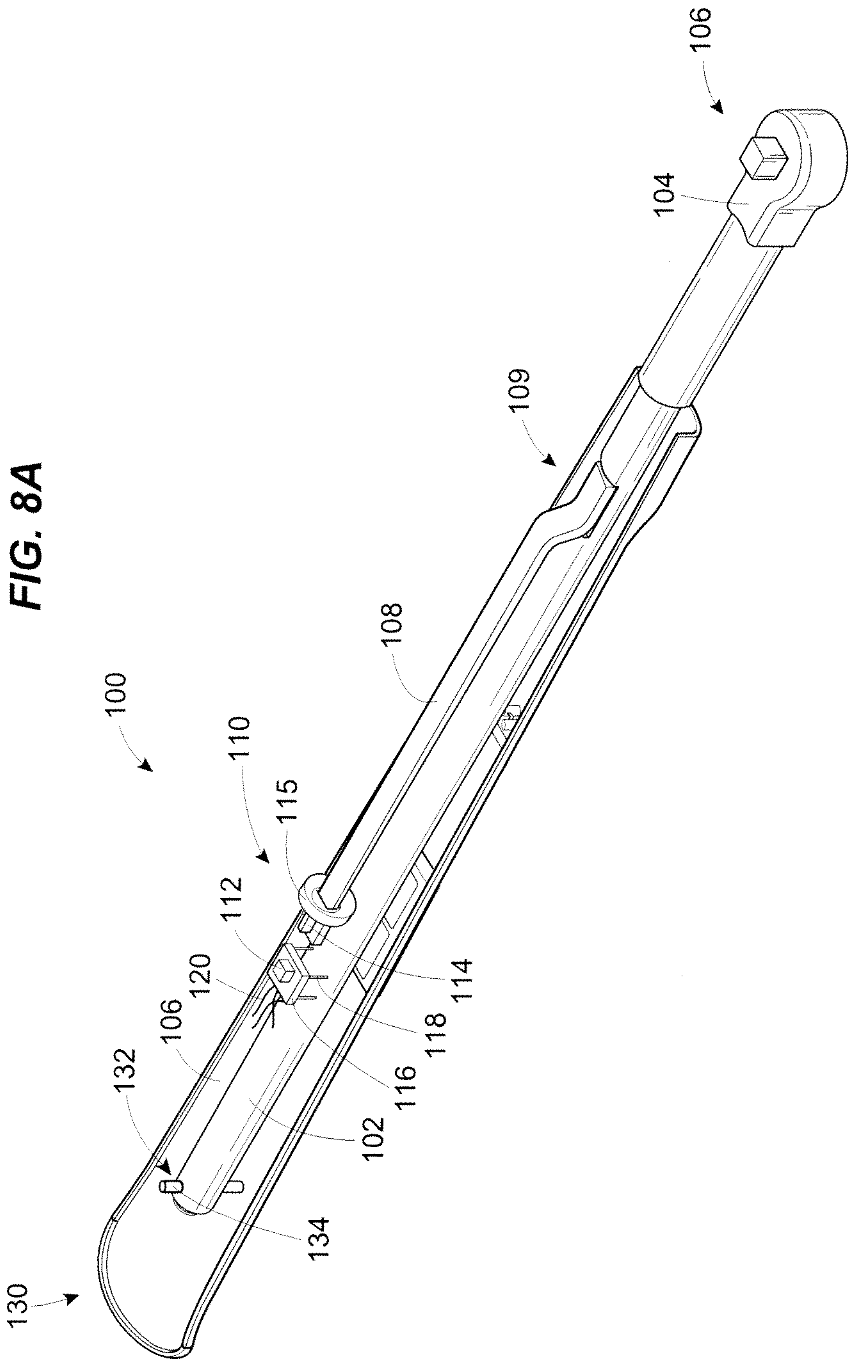
FIG. 8A depicts a perspective view of a digital beam torque wrench having a magnetic element and a magnetic sensor that detects a variation in a direction of the magnetic field of the magnetic element in response to flexure of the main beam of the digital beam torque wrench, according to an embodiment.

In another embodiment illustrated in FIG. 8A, a digital torque wrench 100 includes a main (or "load") beam 102 with a ratchet head 104 or another drive element disposed at a distal end 106, and a stationary (or "indicator") beam 108 fixedly secured at one end to the main beam 102 at a location 109 which may be near the ratchet head 104, for example. At the other end, the stationary beam 108 includes a portion of a displacement sensor assembly 110 in which a magnetic sensor 112 senses the direction of a magnetic field emanating from a magnetic element 114 when the main beam 102 flexes. The magnetic element 114 may include a single magnet of such a shape and a size that the magnetic sensor 112 senses the magnetic field of the magnetic element 114 as emanating from approximately a single point in space. For example, the magnetic element 114 may be shaped as a rectangle, a cylinder, or a horse shoe. Depending on the embodiment, the magnet may be between 1 and 25 mm long, for example, although a magnet of a different size may be appropriate in some embodiments. The magnetic element 114 may further include a housing, a fastening component, etc.

In the embodiment of FIG. 8A, the magnetic sensor 112 is disposed on the main beam 102, and the magnetic element 114 is disposed on the stationary beam 108. However, in other embodiments, the magnetic sensor 112 may be disposed on the stationary beam 108, while the magnetic element 114 may be disposed on the main beam 102. The magnetic sensor 112 and the magnetic element 114 may be separated by a gap of between 1 to 50 mm, in an embodiment. A spacer 115 may be used to secure the magnetic element 114 in a fixed position. As one example, the spacer 115 may be made of plastic and glued onto the stationary beam 108. Further, the magnetic element 114 is positioned so that the North pole of a magnet in the magnetic element 114 is oriented toward the magnetic sensor 112, according to an embodiment.

The magnetic sensor 112 may be installed on a circuit board 116 that is mounted on the main beam 102. For example, the circuit board 116 may include standoffs 118 that attach directly to the main beam 102. However, the circuit board 116 may be mounted on the main beam 102 in another suitable manner (e.g., using an adhesive). In the illustrated embodiment, the circuit board 116 also includes contact wires 120 to couple the circuit board 116 to a main electronics circuit board of the digital torque wrench 100 (not shown), such as ones discussed previously with respect to FIG. 7.

A handle assembly (not shown) may be installed at or near a proximal end 130 of the main beam 102. When pressure is applied to the handle assembly, the handle assembly transfers the force to the main beam 102 at a point 132 via a dowel pin 134. In other embodiments, however, the handle assembly can transfer the force applied thereto in another suitable manner, e.g., along a certain section of the main 102 to which the handle assembly is adhered using friction-fitting. Of course, the force in some scenarios can be applied elsewhere on the main beam 102 at or near the proximate end 130.

In some embodiments, the magnetic sensor 112 may be an anisotropic magnetoresistive (AMR) sensor that detects a variation in angles at which magnetic flux lines traverse the magnetic sensor 112. The magnetic sensor 112 may be as provided a low-cost, high-accuracy electronic chip that consumes little power during operation (e.g., 5 mW or less). Further, the magnetic sensor 112 may have an angular range of +/−90 degrees and the resolution of less than 0.07 degrees, if desired. In at least some of the embodiments, the magnetic sensor 112 can accurately operate with a relatively weak magnet as part of the magnetic element 114.

For example, the magnet of the magnetic element 114 may have the strength of about 80 gauss in saturated mode or more. Depending on the embodiment, a standard or a rare earth magnet can be used as a part of the magnetic element 114. Further, in some embodiments, the magnetic sensor generates a voltage signal that relates to the amount of displacement of the main beam 102 relative to the stationary beam 108 according to a function such as a sine wave, for example. The magnetic sensor 112, according to one such embodiment, may be a magnetic displacement sensor HMC1512 manufactured by Honeywell International Inc. of Morristown, N.J.

In operation, the main beam 102 flexes when a force is applied to the main beam 102 at the point 132 via the handle assembly and the dowel pin 134, for example. As a result, the magnetic sensor 112 moves relative to the magnetic element 114. In the embodiment, of FIG. 8A, the magnetic sensor 112 moves along an arc on a circular path with the location 109 (i.e., the point where the stationary beam 108 is rigidly secured to the main beam 102) at its center. Alternatively, the magnetic element 114 can be regarded as moving relative to the magnetic sensor 112 along an arcuate path. The magnetic sensor 112 detects a variation in the direction of the magnetic field of the magnetic element 114 (e.g., the change in the angle of the magnetic vector directed from the magnetic element 114 to the magnetic sensor 112) and generates a corresponding electrical signal that can be used to measure the amount of torque applied to the handle assembly.

For example, in an embodiment, the magnetic sensor 112 is an electronic module (e.g., a multi-pin chip) including a memory component and a processing component such as an application-specific integrated circuit (ASIC). The magnetic sensor 112 can be configured to detect an amount of displacement of the main beam 102 relative to the stationary beam 108 in view of one or more of such factors as the size of the magnet included in the magnetic element 114, the type of the magnet, the distance between the magnetic element 114 and the magnetic sensor 112, etc. If desired, the magnetic sensor 112 in some of these embodiments can further process the detected amount of displacement and generate a torque measurement in view of such additional factors as the length of the main beam 102 and/or the stationary beam 108, the composition of the main beam 102 and/or the stationary beam 108, etc. For example, a look-up table may be used to convert various displacement readings of the magnetic sensor 112 to corresponding torque measurements. To populate the look-up table, as one example, a series of known torques may be applied to the torque wrench 100, and the displacement for each of the known torques may be measurement and recorded.

Figure 8B:
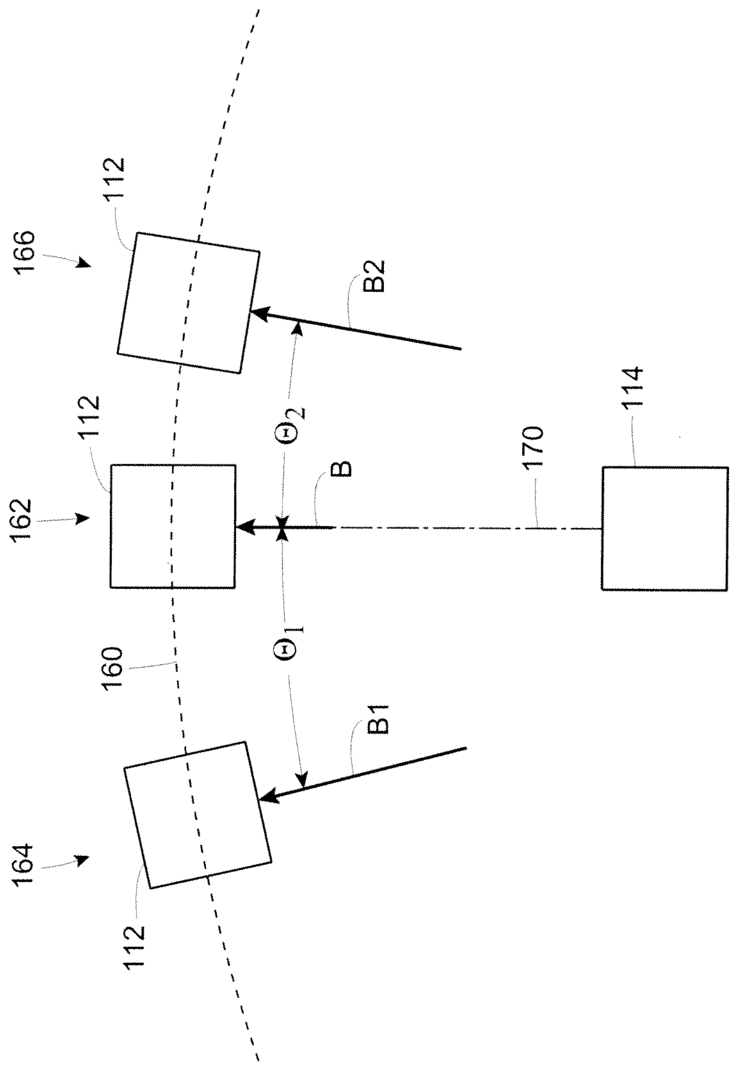
FIG. 8B depicts a schematic diagram that illustrates the interaction between the magnetic element and the magnetic sensor of the digital beam torque wrench illustrated in FIG. 8A, in an embodiment of the present disclosure.

FIG. 8B schematically illustrates how the magnetic sensor 112 moves relative to the magnetic element 114 when the main beam 102 flexes. At a first position 162 of the magnetic sensor 112 along an arcuate path 160, little or no force is applied to the main beam 102 at or near the proximal end 130, and the magnetic sensor 112 is at a "neutral" or "center-of-travel" position associated with an axis 170. In this position, magnetic flux lines emanating from the magnetic element 114, represented in FIG. 8B as a single magnetic vector B for ease of illustration, can be regarded as defining a zero-degree angle between the magnetic vector and the axis 170.

When the magnetic sensor 112 moves to a position 164 in response to a force applied to the handle assembly or elsewhere along the main beam 102, the magnetic vector $B_1$ and the axis 170 form an angle $\theta_1$. The magnetic sensor 112 detects the variation in the direction of the magnetic vector $B_1$ relative to the axis 170 and generates a corresponding electrical signal. Depending on the embodiment, the electrical signal indicates one or more of the angle $\theta_1$, a voltage associated with the displacement of $\theta_1$, a torque measurement, etc.

With continued reference to FIG. 8B, the magnetic vector $B_2$ and the axis 170 form an angle $\theta_2$ when the magnetic sensor 112 moves to a position 166 in response to a different force applied to the handle assembly or elsewhere along the main beam 102. Similar to the scenario discussed above, the magnetic sensor 112 detects the variation in the direction of the magnetic vector $B_2$ relative to the axis 170 and generates a corresponding electrical signal.

Figure 8C:
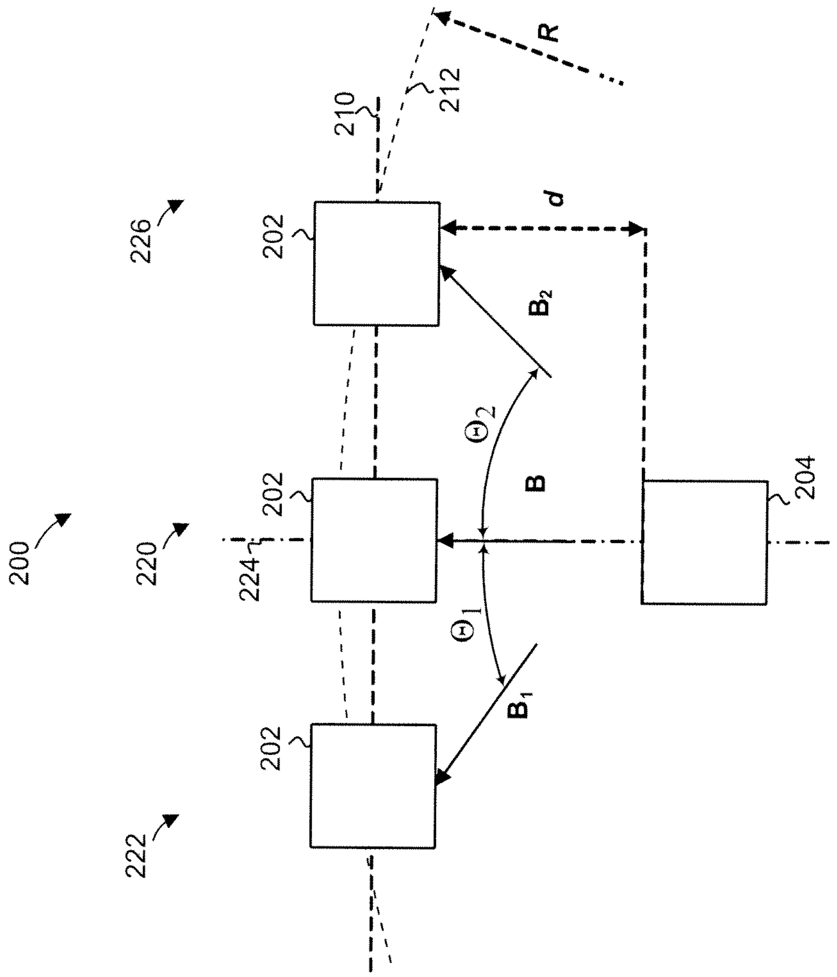
FIG. 8C depicts a schematic diagram that illustrates the interaction between the magnetic element and the magnetic sensor of the digital beam torque wrench illustrated in FIG. 9A, in another embodiment of the present disclosure.

Referring to FIG. 8C, a sensor assembly 200 in other embodiments may include a magnetic sensor 202 selected and/or configured to detect a displacement of a magnetic element 204 along a linear path. For ease of illustration, the movement of the magnetic sensor 202 along a linear path 210 relative to the magnetic element 204 is schematically illustrated in FIG. 8C. The sensor assembly 200 may be disposed on a torque wrench such as the digital beam torque wrench 100, for example, with the magnetic sensor 202 being secured to one of the main beam and the stationary beam, and the magnetic element 204 being secured to the other one of the main beam and the stationary beam. The magnetic element

204 may be similar to the magnetic element 114 discussed above with reference to FIGS. 8A and 8B.

In at least some of these embodiments, the distance d that separates the magnetic sensor 202 and the magnetic element 204 may be relatively small as compared to the radius R of an arcuate path 212 along which the magnetic sensor 202 travels relative to the magnetic element 204 in response to flexure of the main beam (i.e., d<<R). For example, referring back to FIG. 8A, the movement of the end of the stationary beam 108 that is not fixedly secured to the main beam 102 (i.e., the end on which the magnetic element 114 is mounted in the illustrated embodiment) in some cases may be regarded as being approximately linear relative to the point on the main beam 102 where the corresponding part of a sensor assembly is mounted (e.g., the point at which the magnetic sensor 112 is mounted to the main beam 102 in the illustrated embodiment).

When the magnetic sensor 202 moves to a position 222 from a center-of-travel position 220, the magnetic sensor 202 may be configured to detect the variation in the direction of a magnetic vector B (such that the vector B and a center-of-travel axis 224 define a zero-degree angle) and a magnetic vector $B_1$ (such that the vector $B_1$ and the center-of-travel axis 224 define an angle $\theta_1$) to generate an electrical signal indicative of one or more of the angle $\theta_1$, a voltage associated with the displacement of $\theta_1$, a torque measurement, etc. The magnetic sensor 202 similarly may be configured to generate a corresponding electrical signal when the magnetic sensor 202 moves to a position 226 and/or a set of other positions, in accordance with the desired resolution.

Figure 9:
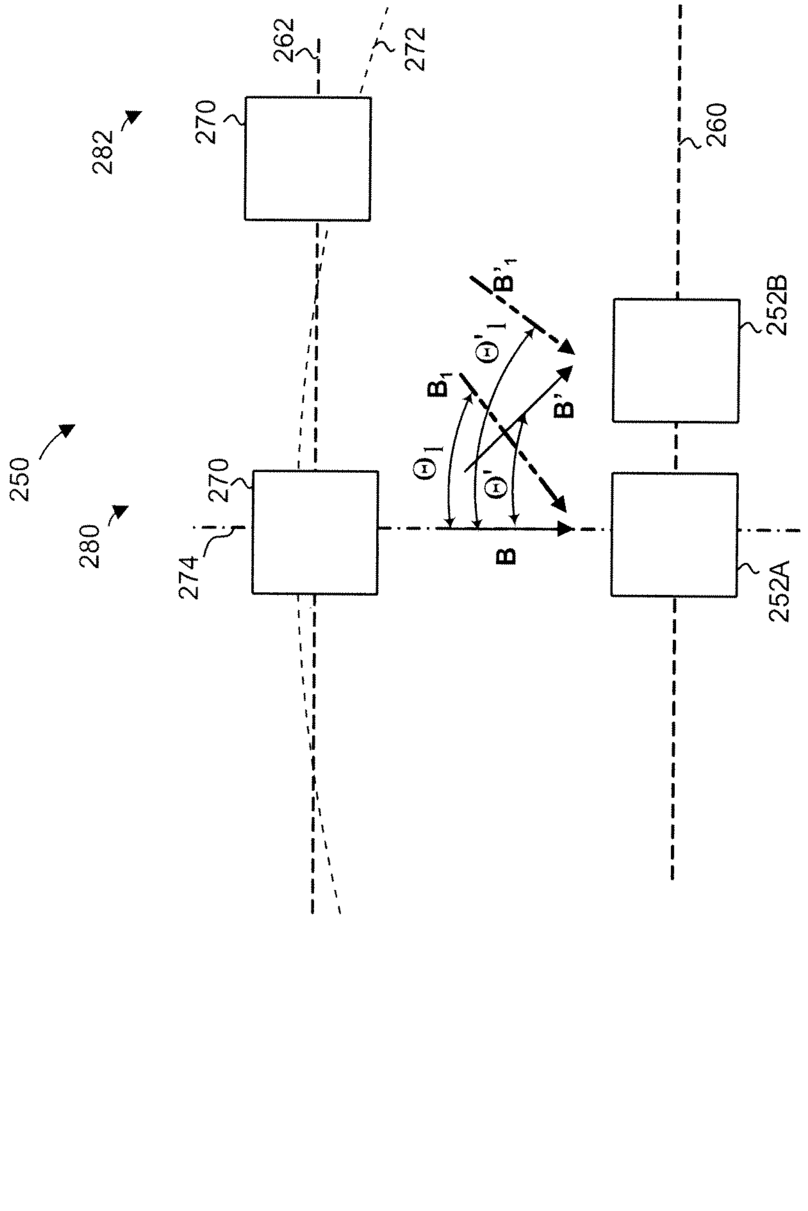
FIG. 9 schematically illustrates another embodiment of a displacement sensor assembly that can be used in a digital beam torque wrench of the present disclosure.

Further, in some embodiments, additional sensors may be used to improve the resolution of a sensor assembly, improve the statistical accuracy of the sensor assembly by relying on several simultaneous measurements, increase the range of motion of a magnetic element relative to a magnetic sensor along a linear path at which accurate measurements are possible, etc. For example, FIG. 9 illustrates a sensor assembly 250, parts of which may be disposed on the main beam 102, and other parts of which may be disposed on the stationary beam 108. In general, the sensor assembly 250 may be mounted on a torque wrench in a manner similar to that discussed with reference to FIGS. 8A and 8B, for example.

In the sensor assembly 250, sensors 252A and 252B are disposed next to each other along a sensor axis 260 parallel to a linear path 262 that approximates (or corresponds to) the actual trajectory which a magnetic element 270 follows in response to flexure of the beam. For example, the magnetic element 270 may move along an arcuate path 272 relative to the magnetic sensors 252A and 252B. In the illustrated embodiment, the sensor 252A is on the center-of-travel axis 274, although in general it is not necessary that one of the sensors of the sensor assembly 250 (or a similar multi-sensor assembly) be disposed on the center-of-travel axis 274. Further, depending on the embodiment, the sensor assembly 250 may include two, three, four, or any other suitable number of magnetic sensors 252A, 252B, 252C, etc. disposed along the sensor axis 260 or in a line, for example, perpendicular to the center-of-travel axis 274. Of course, the magnetic sensors 252A, 252B, etc. may be disposed in a non-linear manner with respect to the center-of-travel axis 274, may be disposed in a line that is on an angle from the center-of-travel axis 274, etc.

In FIG. 9, a magnetic vector B represents a magnetic flux line emanating from the magnetic element 270 and traversing the magnetic sensor 252A in a center-of-travel position 280, and a magnetic vector B' represents a magnetic flux line emanating from the magnetic element 270 and traversing the magnetic sensor 252B in the center-of-travel position 280. The magnetic vector B and the center-of-travel axis 274 from a zero-degree angle, but the magnetic vector B' and the center-of-travel axis 274 form a non-zero-degree angle θ'. In another position 282, a magnetic vector $B_1$ (detected by the magnetic sensor 252A) and the center-of-travel axis 274 form and angle $\theta_1$, while a magnetic vector $B'_1$ (detected by the magnetic sensor 252B) and the center-of-travel axis 274 form and angle $\theta'_1$.

During configuration or calibration, a series of known torques may be used to detect and record displacement for each of the known torques for both of the sensors 252A and 252B and/or electrical signals output by each of the magnetic sensors 252A and 252B. In operation, the magnetic sensor 252A and 252B may provide respective electrical signals which an electronic component (such as a microprocessor, an ASIC, on an electronic circuitry similar to the one discussed previously with respect to FIG. 7, etc.) may combine to generate a more accurate torque measurement. In particular, the electronic component may average the two readings, combine these readings in another suitable manner, or select one of the values using an appropriate statistical technique (e.g., select the mean value from among three or more readings). If desired, the electronic component may assign different weights to the readings obtained from the magnetic sensors 252A and 252B depending on the position of the magnetic element 270 relative to each of the magnetic sensors 252A and 252B. For example, when the magnetic element 270 is in the position 282, the reading from the magnetic sensor 252B may be given more weight than the reading from the magnetic sensor 252A because the magnetic sensor 252B is closer to the magnetic element 270 in this position. In another embodiment, the electronic component may select one of the readings from the magnetic sensors 252A and 252B based on the position of the magnetic element 270 and/or in view of other factors.

From the foregoing detailed description of the specific embodiments of a torque wrench and/or related components, it should be apparent that a digital beam torque wrench has been disclosed. Although various embodiments and features have been described herein, this has been done solely for the purposes of illustrating various features and aspects of the disclosure and is not intended to be limiting with respect to the scope of the disclosure as defined in the appended claims, which follow.

Indeed, the versatility and flexibility of the disclosed system and the manners in which it may be implemented are believed to be important features of the disclosure. In accordance with one aspect, an apparatus comprises a completely flexible digital beam torque wrench system that can be defeatured, or upfeatured to provide a wide range of torque application information, including but without limitation, for automobiles, aircraft, outer space, environmental systems, and so on.

At the highest level, an apparatus includes a fully automatic reporting digital beam torque wrench which will allow precise application of torque in easy as well as difficult access situations. In a fully featured implementation, the digital beam torque wrench is designed to monitor its own operational status and let its operator(s) know when operational intervention is required, including but not limited to, situations such as recharging, torque limit approach, torque limit reached, and torque limit exceeded indicators.

Key technology components of the disclosure include a high accuracy potentiometer coupled with an input and output data display system in a small package. In an embodiment, each torque action results in continuous torque condition data acquisition, recording, and transmission in multiple methods of human factors engineering feedback, including but not limited to, audible buzzer, data capture beep, numeric digital display, wireless bidirectional data and control information transmission to and from a remotely located base data management device, and torque units of measurement selection identification.

Advantageously, measurement time is reduced and is only limited by the training and physical environment access of the operator, which may be manifest in an embodiment to include automated mechanical actuation of the digital beam torque wrench without direct human contact or intervention during the application of torsional force.

In accordance with another important aspect of the disclosure, in a given implementation a "defeatured" system having fewer than all of the optional functional elements described herein can be provided. At the lowest cost, the digital beam torque wrench itself, with only a visual indication of torsional force applied in only a single unit of measure might be deployed without inclusion of data storage, audible, protective covering of any type or other optional functional elements disclosed herein. Such a simple implementation of the digital beam torque wrench still offers significant benefits and improvements in accuracy and minimum time to perform application of torsional forces as compared with prior art systems.

In another implementation a simple replaceable battery powered digital beam torque wrench can be included, such that the guesswork can be taken out of simple torque application and tool maintenance problems.

In summary, it is believed that an important aspect of the disclosure is a very accurate digital beam torque wrench that can be as simple or as complex as needed for a given application.

What is claimed is:

1. A torque wrench, comprising:

a main beam having a distal end and a proximal end;

a drive element disposed at the distal end of the main beam;

a handle assembly disposed at the proximal end of the main beam;

a stationary beam having a distal end and a proximal end, wherein the stationary beam is fixedly secured to the main beam at a first location on the main beam and a first location on the stationary beam;

a displacement sensor assembly that generates a signal indicative of an amount of displacement of the main beam relative to the stationary beam, the displacement sensor assembly including:

a sensor rigidly secured to one of the main beam and the stationary beam at a second location on the main beam or a second location on the stationary beam, and an actuating element rigidly secured to the other one of the main beam and the stationary beam at the second location on the main beam or the second location on the stationary beam;

wherein the sensor interacts with the actuating element to generate an electrical signal indicative of an amount of deflection of the main beam relative to the stationary beam when a force is applied on the handle assembly; and an electronic component configured to generate a torque measurement based on the generated electrical signal, and to store at least one of the generated electrical signal and the torque measurement for a plurality of positions of the main beam relative to the stationary beam.

2. The torque wrench of claim 1, wherein the sensor is one of a magnetic sensor, an optical sensor, and a rack-and-gear sensor.

3. The torque wrench of claim 1, wherein the plurality of positions correspond to intermediate positions between a center of travel position, at which no force is applied on the handle assembly, and an end position at which a maximum torque has been applied.

4. A torque wrench, comprising:

a main beam having a distal end and a proximal end;

a drive element disposed at the distal end of the main beam of the main beam;

a handle assembly disposed at the proximal end;

a stationary beam having a distal end and a proximal end, wherein the stationary beam is fixedly secured to the main beam at a first location on the main beam and a first location on the stationary beam; and a displacement sensor assembly that generates an electrical signal indicative of an amount of displacement of the main beam relative to the stationary beam, the displacement sensor assembly including:

a magnetic sensor rigidly secured to one of the main beam and the stationary beam at a second location on the main beam or a second location on the stationary beam, and an actuating magnetic element rigidly secured to the other one of the main beam and the stationary beam at the second location on the main beam or the second location on the stationary beam;

wherein the actuating magnetic element affects a magnetic field sensed by the magnetic sensor when the main beam flexes in response to a force applied on the handle assembly, so that the displacement sensor assembly generates the electrical signal indicative of the amount of displacement using the sensed magnetic field.

5. The torque wrench of claim 4, wherein the actuating magnetic element includes exactly one magnet to define a single point from which the magnetic field sensed by the magnetic sensor emanates.

6. The torque wrench of claim 5, wherein the magnetic sensor is an anisotropic magnetoresistive (AMR) sensor.

7. The torque wrench of claim 4, wherein:

the actuating magnetic element generates a magnetic field having a direction relative to the magnetic sensor, and the magnetic sensor senses a variation in the direction of the magnetic field when the main beam flexes in response to the force applied on the handle assembly.

8. The torque wrench of claim 4, wherein:

the actuating magnetic element is rigidly secured to the stationary beam, and the magnetic sensor is rigidly secured to the main beam.

9. The torque wrench of claim 8, further comprising a spacer disposed on the stationary beam to hold the actuating magnetic element in a fixed position on the stationary beam.

10. The torque wrench of claim 4, wherein:

the first location on the main beam is near the distal end of the main beam, and the second location on the main beam is closer to the proximate end than to the distal end.

11. The torque wrench of claim 4, further comprising an electronic element coupled to the magnetic sensor to receive the electrical signal from the magnetic sensor and derive a torque measurement based on the received electrical signal.

12. The torque wrench of claim 11, further comprising at least one of a display component or an audio component to generate at least one of a visual or an audio indication of the torque measurement.

13. The torque wrench of claim 4, wherein the magnetic sensor is mounted on a circuit board that is rigidly coupled to the main beam via a plurality of standoffs.

14. A torque wrench, comprising:

a main beam having a distal end and a proximal end;

a drive element disposed at the distal end of the main beam;

a handle assembly disposed at the proximal end of the main beam;

a stationary beam having a distal end fixedly secured to the main beam near one of the distal end or the proximal end of the main beam at a first location on the main beam and a first location on the stationary beam, and having a proximal end; and a magnet rigidly secured to one of the main beam and the stationary beam at a second location on the main beam or a second location on the stationary beam, and having a magnetic field associated therewith; and a magnetic sensor rigidly secured to the other one of the main beam and the stationary beam at the second location on the main beam or the second location on the stationary beam; wherein the magnet and the magnetic sensor move relative to each other along an arcuate path when the main beam flexes in response to a force applied on the handle assembly, and the magnetic sensor senses a variation in a direction of the magnetic field when the magnet and the magnetic sensor move relative to each other, and generates an electrical signal indicative of the sensed variation.

15. The torque wrench of claim 14, further comprising an electronic element coupled to the magnetic sensor to receive the electrical signal from the magnetic sensor and derive a torque measurement based on the received electrical signal.

16. The torque wrench of claim 15, further comprising at least one of a display component or an audio component to generate at least one of a visual or an audio indication of the torque measurement.

17. The torque wrench of claim 14, wherein the magnetic sensor is an anisotropic magnetoresistive (AMR) sensor.

18. The torque wrench of claim 14, wherein:

the magnet is rigidly secured to the stationary beam, and the magnetic sensor is rigidly secured to the main beam.

19. The torque wrench of claim 18, further comprising a spacer disposed on the stationary beam to hold the magnet in a fixed position on the stationary beam.

20. The torque wrench of claim 14, wherein the magnetic sensor is mounted on a circuit board that is rigidly coupled to the main beam via a plurality of standoffs.

21. The torque wrench of claim 14, wherein the magnetic sensor is a first magnetic sensor, and the electrical signal is a first electrical signal; the torque wrench further comprising:

a second sensor rigidly secured to the other one of the main beam and the stationary beam at the second location on the main beam or the second location on the stationary beam;

wherein the second magnetic sensor senses a variation in the direction of the magnetic field when the magnet and the second magnetic sensor move relative to each other, and generates a second electrical signal indicative of the sensed variation.

22. The torque wrench of claim 21, wherein the first magnetic sensor and the second magnetic sensor are configured to sense the variation in the direction of the magnetic field for a movement of the magnet relative to the first magnetic sensor and the second magnetic sensor along a straight line.

23. The torque wrench of claim 21, further comprising a processor communicatively coupled to each of the first magnetic sensor and the second magnetic sensor to generate a torque measurement based on the first electrical signal and the second electrical signal.

* * * * *